P. T. SIMMONS.
BOX OR CASE.
APPLICATION FILED OCT. 6, 1915.
1,181,177. Patented May 2, 1916.
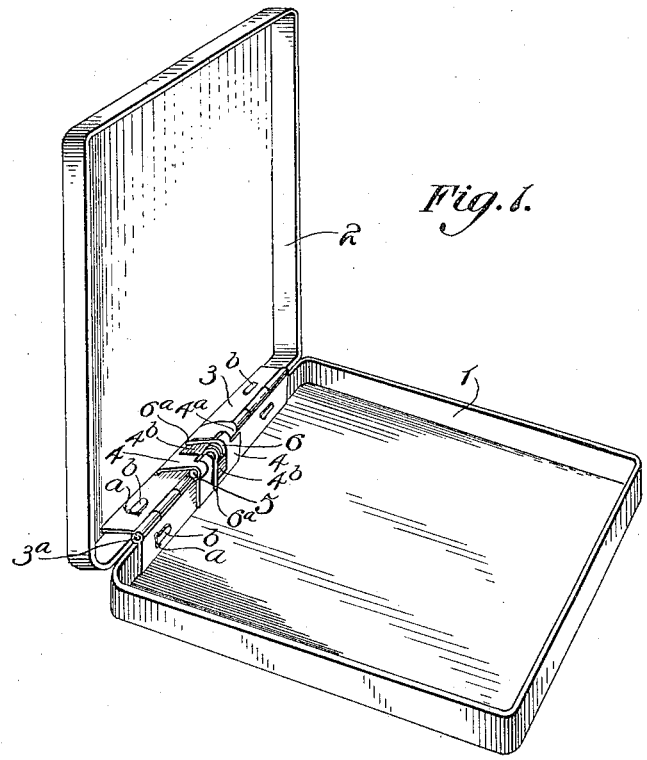
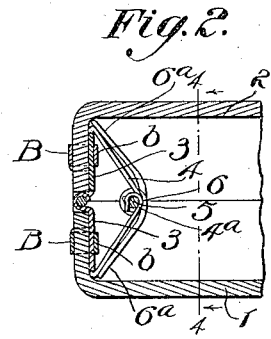
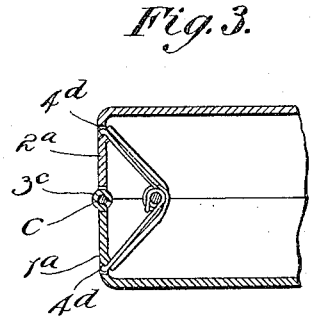
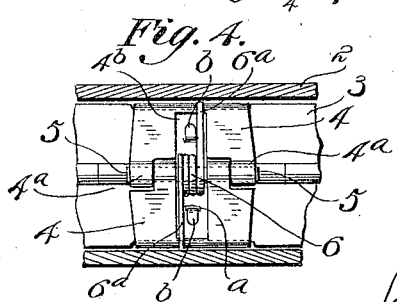
Inventor:
Parker T. Simmons.

UNITED STATES PATENT OFFICE.

PARKER T. SIMMONS, OF ATTLEBORO FALLS, MASSACHUSETTS, ASSIGNOR TO THE MASON BOX COMPANY, A CORPORATION OF MASSACHUSETTS.

BOX OR CASE.

1,181,177.          Specification of Letters Patent.          Patented May 2, 1916.

Application filed October 6, 1915. Serial No. 54,369.

*To all whom it may concern:*

Be it known that I, PARKER T. SIMMONS, citizen of the United States, residing at Attleboro Falls, Massachusetts, have invented certain new and useful Improvements in Boxes or Cases, of which the following is a specification.

My present invention relates to improvements in spring hinges designed to hold the hinge leaves open or closed. These hinges are particularly adapted for use on boxes of various kinds such as jewelry, perfume, etc.

Among the objects of the invention are to provide a box having spring means of simple and economical construction which may be embodied at will in either a composition box with a separate or applied hinge, or in a metal box with the box edges or ends forming parts or leaves of the hinge.

The invention includes the novel features of construction and arrangement and combination of parts hereinafter described and particularly defined by the appended claims.

In the accompanying drawings: Figure 1 is a perspective view illustrating a box embodying one form of my invention with the cover open. Fig. 2 is a sectional detail showing the position the parts assume when the cover is closed. Fig. 3 is a view similar to Fig. 2 showing the embodiment of my invention in a box, the walls of which form the leaves of the hinge; Fig. 4 is a sectional detail taken on line 4—4 of Fig. 2.

Referring by reference characters to this drawing and referring first to Figs. 1, 2 and 4, the lower or body member of the box is designated at 1 and the upper or cover member at 2. These may be made of any suitable material such as card-board, fiber, or the like and when of non-metallic material are connected together by a hinge 3, the leaves of which are preferably secured to the end (or side) walls of the body and cover by stapling. A convenient manner of effecting this is to provide the hinge leaves with slots $a$ through which are projected prongs $b$ which are carried by bars B lying against the outer face of the box wall, the prongs being passed through the box wall and slots and clenched over upon the inside.

In order to effect the spring closing of the box and to hold it in either an open or a closed position, I provide an attachment comprising a pair of plates or leaves 4, hinged together by a pivot pin 5 passing through eyes $4^a$ carried by the leaves. The leaves 4 are cut away in the center, as indicated at $4^b$ and around the exposed portion of the pin 5, where it crosses this space is a coil 6 of spring wire, the opposite ends $6^a$ of which bear against the leaves 4. The outer edges of these leaves 4 are hingedly connected to the outer edges of the hinge leaves 3, preferably by bending over the edges of the leaves 4 to cause them to hook over the edges of the leaves 3, which may be recessed for the width of leaves 4 as shown.

The axis 5 of hinge plates 4 being offset from the axis $3^a$ of hinge 3 toward the interior of the box, and the spring tending to press leaves 4 backward toward each other, the result is that when the box is closed the spring and supplemental hinge tend to hold it closed, while when opened an eighth or more the spring will throw the cover up to a vertical or quarter open position, as shown in Fig. 1.

The opening movement of the cover causes the hinge 5 to be drawn toward the hinge 3 until, when the cover has reached the position shown in Fig. 1, the hinge 5 or hinged portions of the leaves will have been drawn in contact with the hinge 3 or hinged portion of the box members, thereby limiting the further opening movement of the box cover.

When applying my attachment to a metal box, it is obvious that the separate spring 3 may be dispensed with, the end walls $1^a$ and $2^a$ being provided with eyes $c$ connected by a hinge pin $3^c$ and forming the hinge for the box. In this event the ends of the supplemental hinge plates 4 would be hooked through slots in the box walls, as indicated at $4^d$ in Fig. 3.

Having thus described my invention what I claim is:

1. A spring hinge for jewelry boxes and the like comprising a pair of members having a hinge connection and adapted to lie in the same plane when the box is closed, and a pair of leaves hinged together and having their ends connected with said members, and a spring acting on said leaves and tending to press said ends toward the hinge connection of said members.

2. A jewelry box or case having two wall members hinged together, and a pair of leaves within the box and hinged together, having their ends connected with the wall members on opposite sides of the hinge thereof, and a spring tending to fold said leaves toward the box hinge, said leaves lying, when the box is closed, at acute angles to the wall members whereby when the box is opened the hinged portion of said leaves is drawn into contact with the hinged portion of the box members and limits the opening movement of the box.

In testimony whereof, I affix my signature in presence of two witnesses.

PARKER T. SIMMONS.

Witnesses:
FRED B. BYNAM,
R. I. RHODES.

Copies of this patent may be obtained for five cents each, by addressing the "Commissioner of Patents, Washington, D. C."